United States Patent [19]

Akutagawa

[11] Patent Number: 4,573,371

[45] Date of Patent: Mar. 4, 1986

[54] AUXILIARY POWER TRANSMISSION HAVING SYNCHRONIZING MECHANISM

[75] Inventor: Hitoshi Akutagawa, Hiroshima, Japan

[73] Assignee: Mazda Motor Corporation, Hiroshima, Japan

[21] Appl. No.: 342,587

[22] Filed: Jan. 25, 1982

[30] Foreign Application Priority Data

Jan. 26, 1981 [JP] Japan .................................. 56-10597

[51] Int. Cl.⁴ .......................... F16H 3/38; F16D 11/00
[52] U.S. Cl. ...................................... 74/339; 192/53 F
[58] Field of Search ........................ 74/339; 192/53 F

[56] References Cited

U.S. PATENT DOCUMENTS

| | | | |
|---|---|---|---|
| 2,397,943 | 4/1946 | Bull | 192/53 F |
| 2,947,396 | 8/1960 | Altmann | 74/339 |
| 2,993,574 | 7/1961 | Gardner | 74/339 |
| 3,548,983 | 12/1970 | Hiraiwa | 192/53 F |
| 4,132,122 | 1/1979 | Richards | 74/339 |
| 4,261,216 | 4/1981 | Braun | 74/339 |
| 4,271,943 | 6/1981 | Kuzma | 192/53 F |
| 4,314,627 | 2/1982 | Nozawa | 74/339 |
| 4,329,885 | 5/1982 | Morscheck | 74/339 |
| 4,360,094 | 11/1982 | Ikemoto et al. | 74/339 |

*Primary Examiner*—Allan D. Herrmann
*Assistant Examiner*—Stephen Andrews
*Attorney, Agent, or Firm*—Fleit, Jacobson, Cohn & Price

[57] ABSTRACT

An automobile auxiliary power transmission having a synchronizer mechanism comprised of a synchronizer hub, a pair of synchronizer rings cooperating respectively with a low speed and high speed gears, and an axially movable synchronizer sleeve. The synchronizer sleeve has spline teeth for engagement with the synchronizer hub and with the synchronizer rings and the gears. The spline tooth on the sleeve has an axial length which is sufficient to engage with both of the synchronizer rings when it is disengaged from both of the gears. The arrangement is effective to make the shifting stroke of the sleeve smaller than that in conventional structures.

8 Claims, 15 Drawing Figures

FIG. 6
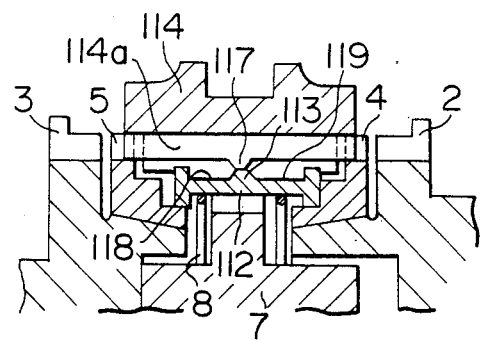
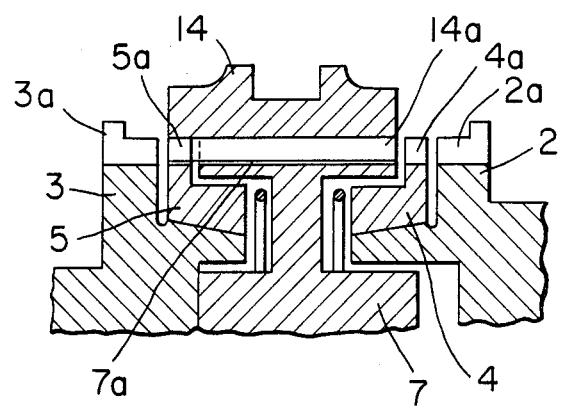
FIG. 7

AUXILIARY POWER TRANSMISSION HAVING SYNCHRONIZING MECHANISM

The present invention relates to an automobile power transmission and more particularly to an auxiliary power transmission adapted to be associated with a main power transmission for providing two alternative series of gear ratios. More particularly, the present invention pertains to a synchronizer mechanism for such auxiliary power transmission.

Heretofore, it has been known in automobiles to provide an auxiliary power transmission associated with a main power transmission so that two alternative series of gear ratios are provided. Such auxiliary power transmission generally includes axially aligned input and output shafts, a low speed gear splined to the output shaft and a high speed gear which is rotatably mounted on the input shaft and connected through a gear mechanism with the output shaft. The input shaft carries a hub having an external gear and a sleeve having an internal gear is provided for alternately connecting the external gear of the hub with the low speed or high speed gear. The auxiliary transmission further includes a synchronizing mechanism which comprises an axially extending hub portion provided on each of the low speed and high speed gears and having a frustoconical outer surface, and a synchronizer ring having a frustoconical inner surface adapted for sliding engagement with the frustoconical outer surface of the hub portion on each of the low speed and high speed gears. Each synchronizer ring has an external gear adapted for engagement with the internal gear of the sleeve, and keys are carried on the sleeve. The arrangement is such that, when the sleeve is moved axially toward one of the low speed and high speed gears, the internal gear in the sleeve is meshed with the external gear in the appropriate one of the synchronizer ring and at the same time the keys engage the particular synchronizer ring to force it toward the associated gear. Thus, the frustoconical inner surface of the synchronizer ring is forced into sliding engagement with the frustoconical outer surface of the hub portion of the particular gear so that the rotating speed of the synchronizer ring and that of the sleeve are synchronized with the gear. A further axial movement of the sleeve therefore accomplishes a meshing engagement between the internal gear in the sleeve and the particular one of the low speed and high speed gears to thereby connect the latter with the input shaft through the hub and the sleeve.

According to the conventional structure, the arrangement is such that the sleeve can take a neutral position where the internal gear therein is free from either of the external gears on the synchronizer rings, and when the sleeve is axially moved toward either one of the low speed and high speed gears, the internal gear in the sleeve is meshed with the external gear in the appropriate one of the synchronizer rings. It will therefore be understood that a relatively large stroke is required for the synchronizer sleeve to change the meshing engagement from one to the other of the low speed and high speed gears. This will mean that the lever ratio in the actuating mechanism cannot be increased and a substantial actuating force is accordingly required.

It is therefore an object of the present invention to provide a synchronizing mechanism for an auxiliary power transmission in which the stroke of the synchronizer sleeve can be decreased.

Another object of the present invention is to provide a synchronizing mechanism for an auxiliary power transmission in which actuating force can be decreased.

According to the present invention, the above and other objects can be accomplished by an auxiliary power transmission comprising axially aligned input and intermediate shafts which are rotatable with respect to each other, a first gear rotatably mounted on said input shaft and having first external teeth, a second gear mounted on said intermediate shaft to rotate therewith and having second external teeth, a synchronizer hub disposed between said first and second gears and mounted on said input shaft to rotate therewith, said synchronizer hub being formed with external teeth, a synchronizer sleeve having internal teeth which are in meshing engagement with said external teeth on said synchronizer hub and axially movable to bring the internal teeth thereon into meshing engagement alternatively with said first and second external teeth on said first and second gears, first and second synchronizer rings respectively provided between said synchronizer hub and said first and second gears, said first and second synchronizer rings being formed with external teeth adapted to mesh with said internal teeth of the synchronizer sleeve, first friction clutch means provided between said first gear and said first synchronizer ring for synchronizing said first gear in rotation with said synchronizer sleeve when the sleeve is moved axially toward the first gear, second friction clutch means provided between said second gear and said second synchronizer ring for synchronizing said second gear in rotation with said synchronizer sleeve when the sleeve is moved axially toward the second gear, said synchronizer sleeve having an axial length so that the internal teeth therein engage both the external teeth on the first and second synchronizer rings when the sleeve is out of engagement with said first and second gears.

In a preferable aspect of the present invention, means is provided between the synchronizer sleeve and the synchronizer hub for alternately forcing one of the first and second synchronizer rings toward the gear cooperating with said one synchronizer ring when the synchronizer sleeve is axially moved toward the gear cooperating with said one synchronizer ring to thereby engage the friction clutch means between said one synchronizer ring and said cooperating gear. The forcing means may be embodied in the form of at least one key disposed between the synchronizer sleeve and the synchronizer hub, engagement means being provided between the synchronizer sleeve and the key so that the key is forced against one of the synchronizer rings by the sleeve as soon as the sleeve is disengaged from the gear cooperating with the other synchronizer ring. The key may be provided with resilient means for forcing it radially outwardly and formed at an intermediate portion with radially outward projection means, the synchronizer sleeve being formed with radially inward projection means adapted for engagement with said radially outward projection means on the key, said resilient means allowing the projection means on the sleeve to ride and pass over the projection means on the key when the sleeve is further forced axially after the friction clutch means is engaged.

The above and other objects and features of the present invention will become apparent from the following descriptions of a preferred embodiment taking reference to the accompanying drawings, in which.

Figure 4A:
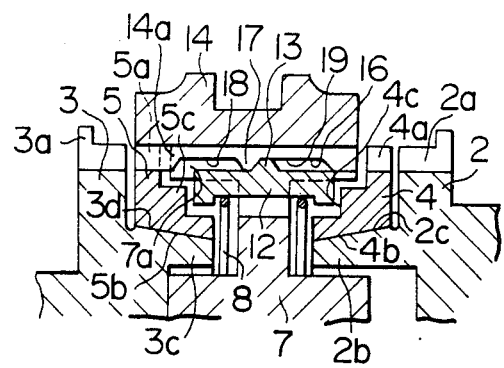
Figure 4B:
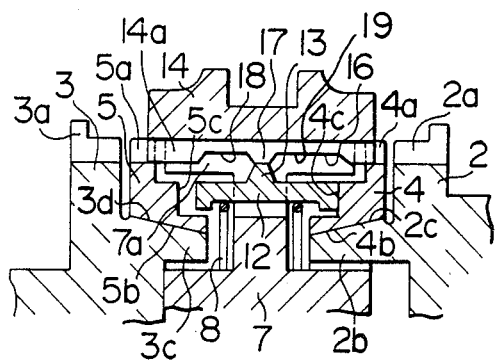
Figure 5A:
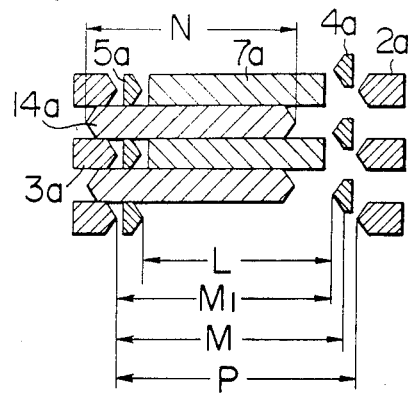

FIGS. 4(a), (b), (c) and (d) show fragmentary sectional views of the synchronizer mechanism in different positions of the synchronizer sleeve;

FIGS. 5(a), (b), (c), (d) and (e) are fragmentary sectional views showing gear changing steps; and, FIG. 6 is a sectional view similar to FIG. 4(b) but showing another embodiment.

Figure 2:
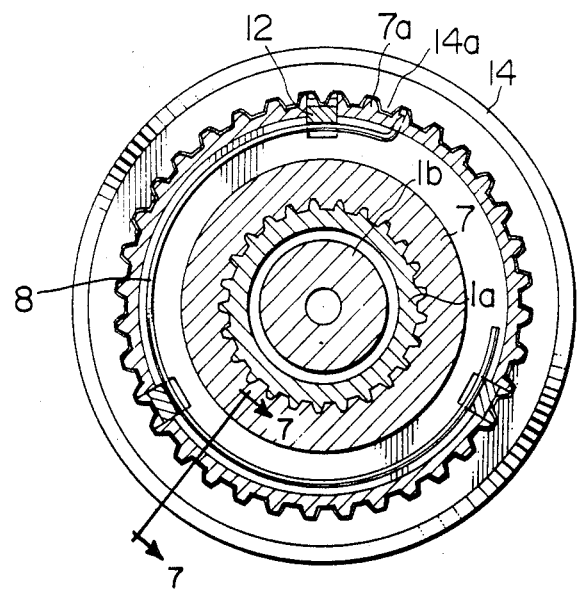
FIG. 2 is a sectional view taken substantially along the line II—II of FIG. 1.

FIG. 7 is a fragmentary sectional view of the synchronizing mechanism taken along the line 7—7 of FIG. 2.

Figure 1:
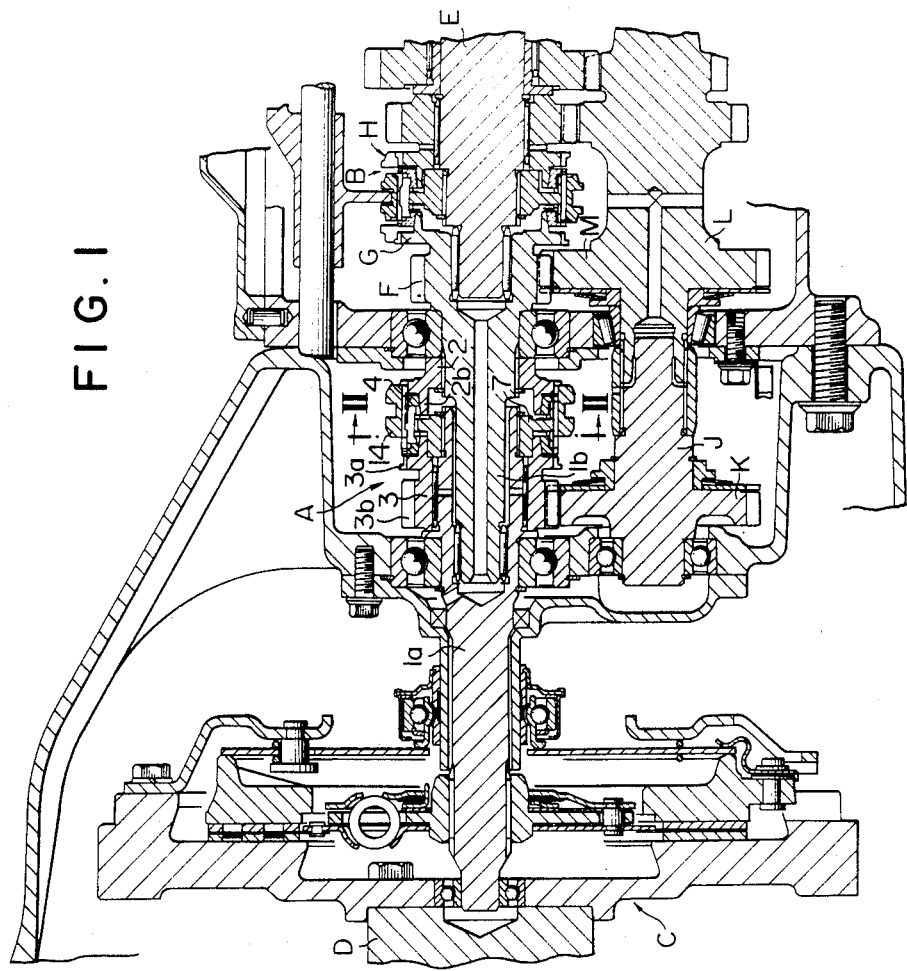
FIG. 1 is a fragmentary sectional view of an automobile transmission having an auxiliary power transmission embodying the features of the present invention.

Referring now to the drawings, particularly to FIG. 1, the transmission shown therein includes an auxiliary power transmission A and a main power transmission B. The auxiliary power transmission A includes an input shaft 1a and an intermediate shaft 1b which are axially aligned and rotatable with each other. The input shaft 1a is connected through a clutch mechanism C with an engine drive shaft D. The main power transmission B includes a main shaft E which is axially aligned with the intermediate shaft 1b.

Referring also to FIGS. 2 through 4, there is mounted on the intermediate shaft 1b a low speed gear 2 having external spline teeth 2a. The gear 2 is splined to the shaft 1b to rotate therewith. The input shaft 1a rotatably carries a high speed gear 3 which has external spline teeth 3a and external gear teeth 3b. On the input shaft 1a, there is further mounted a synchronizer hub 7 which is splined to the input shaft 1a to rotate therewith. The synchronizer hub 7 has external spline teeth 7a and a synchronizer sleeve 14 having internal spline teeth 14a is engaged with the synchronizer hub 7. Thus, the rotation of the input shaft 1a is transmitted through the hub 7 to the sleeve 14.

As shown in FIG. 1, the intermediate shaft 1b is formed with a gear F and a gear G having external spline teeth which form a part of a synchronizing mechanism H in the main power transmission B. The auxiliary power transmission A includes a counter-shaft J formed with a gear K having gear teeth which are in meshing engagement with the gear teeth 3b formed on the high speed gear 3. The counter-shaft J is connected with a second counter-shaft L which is formed with a gear M meshing with the gear F on the intermediate shaft 1b. The second counter-shaft L is further formed with transmission gears which constitute parts of the main power transmission.

Between the low speed gear 2 and the synchronizer hub 7, there is provided a synchronizer ring 4 which has external spline teeth 4a adapted for engagement with the internal spline teeth 14a on the sleeve 14. The low speed gear 2 is formed at a side facing the synchronizer hub 7 with an axially extending hub portion 2b having a frustoconical outer surface 2c. The synchronizer ring 4 is formed with a frustoconical inner surface 4b which is complementary to the surface 2c of the low speed gear 2. Similarly, a synchronizer ring 5 is provided between the high speed gear 3 and the synchronizer hub 7. The high speed gear 3 is formed with an axially extending hub portion 3c having a frustoconical outer surface 3d.

The synchronizer ring 5 has an external spline teeth 5a adapted for engagement with the internal spline teeth 14a on the synchronizing sleeve 14. Further, the synchronizer ring 5 is formed with a frustoconical inner surface 5b complementary to the surface 3d on the high speed gear 3.

Figure 3A:
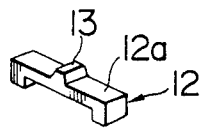
FIG. 3(a) is a perspective view of a synchronizer key used in the auxiliary power transmission.
Figure 3B:
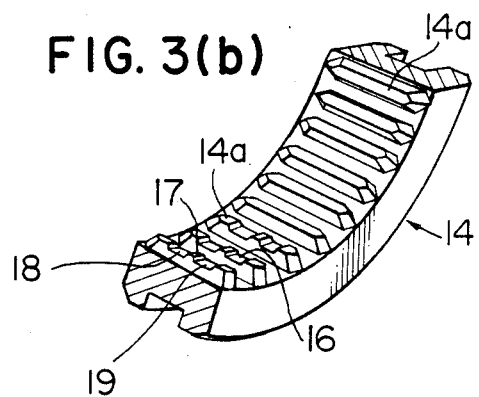
FIG. 3(b) is a fragmentary perspective view showing the internal teeth in the synchronizer sleeve.

As shown in FIG. 2, there are provided three synchronizer keys 12 which are located at three angularly equi-distant positions between the synchronizer hub 7 and the synchronizer sleeve 14. The synchronizer key 12 has a general configuration as shown in FIG. 3(a) and formed at an intermediate portion on the radially outer surface 12a with a radially outward projection 13. As shown in FIG. 3(b), at each position where the key 12 is located, one or more of the spline teeth 14a are cut to form recesses 16 for receiving the projection 13 on the key 12. Each of the recesses 16 is comprised of two axially aligned recess portions 18 and 19 to leave a projection 17 therebetween. The projection 13 on the key 12 has axially opposite end surfaces which are inclined with respect to a plane perpendicular to the axis of the input shaft 1a. Similarly, the projection 17 on the sleeve 14 has inclined axially opposite end surfaces. The keys 12 are resiliently forced radially outwardly by means of springs 8 as shown in FIGS. 2 and 4. Further, the synchronizer rings 4 and 5 are formed at the sides adjacent to the keys 12 with annular surfaces 4c and 5c which are adapted to be engaged by the adjacent ends of the keys 12 when the keys 12 are moved thereto.

Figure 5B:
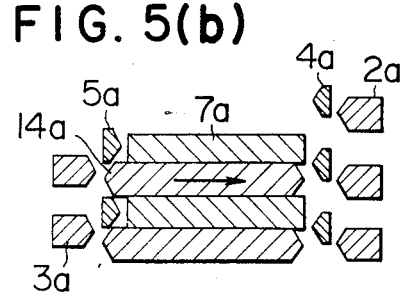
Figure 5C:
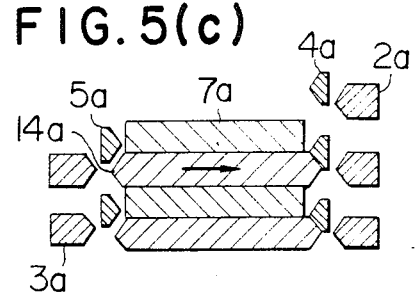

As shown in FIG. 4(b) and FIG. 5(c), the spline teeth 14a on the synchronizer sleeve 14 are of axial lengths which are sufficient to keep the spline teeth 14a in engagement simultaneously with both the teeth 4a and 5a on the synchronizer rings 4 and 5. Supposing that the synchronizer sleeve 14 is shifted toward the high speed gear 3 so that the spline teeth 14a are engaged with the spline teeth 3a on the gear 3 as shown in FIG. 5(a), the input shaft 1a is connected through the hub 7 and the sleeve 14 with the high speed gear 3. Therefore, the rotation of the input shaft 1a is transmitted through the gear 3 and further through the gear K to the counter-shaft J. In this position, the projection 13 on the key 12 is received by the recess portion 19. When it is desired to connect the low speed gear 2 with the input shaft 1a, the synchronizer sleeve 14 is axially moved toward the gear 2. In the initial stage of such operation, the spline teeth 14a on the sleeve 14 are at first disengaged from the spline teeth 3a on the gear 3. In this instance, the spline teeth 14a are still in engagement with the spline teeth 5a on the synchronizer ring 5 but not with the spline teeth 4a on the synchronizer ring 4 as shown in FIG. 4(a) and FIG. 5(b).

As the synchronizer sleeve 14 is further moved axially in the same direction, the synchronizer keys 12 are forced in the same direction through the engagement between the projections 13 and 17 so that the keys 12 are engaged with the surface 4c. Thus, the rotation of the synchronizer ring 4 is synchronized with the rotation of the sleeve 14. Then, the spline teeth 14a are meshed with the spline teeth 4a through a further axial movement of the sleeve 14. At this position, the spline teeth 14a on the sleeve 14 are engaged with both the spline teeth 4a and 5a on the rings 4 and 5 as shown in FIG. 4(b) and FIG. 5(c). In order to readily bring the spline teeth 14a on the sleeve 14 into meshing engagement with either the spline teeth 4a or 5a, each of the teeth 14a is chamfered at the opposite axial ends as shown in FIG. 3(b) and FIG. 5 and each of the teeth 4a and 5a is correspondingly chamfered at an end adjacent to the tooth 14a. In the position shown in FIG. 4(b) and FIG. 5(c), the chamfered ends of the spline teeth 14a are in engagement with the chamfered ends of the spline teeth 4a and 5a.

Figure 4C:
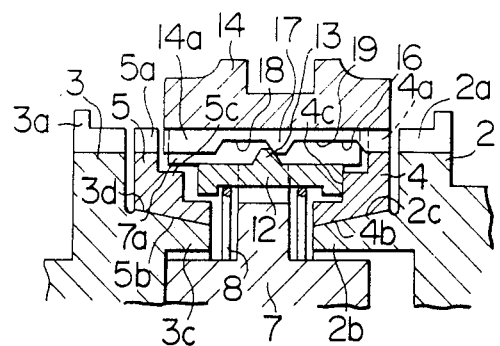
Figure 5D:
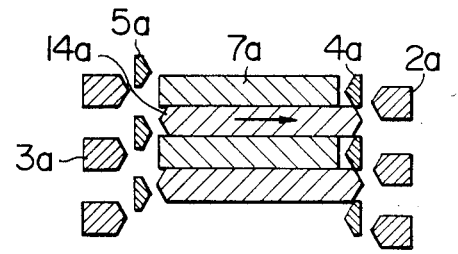

As the synchronizer sleeve 14 is further moved axially, the spline teeth 14a thereon are disengaged from the spline teeth 5a on the synchronizer ring 5 and completely engaged with the spline teeth 4a on the ring 4 as shown in FIGS. 4(c) and 5(d). By this time, the frustoconical surface 4b of the synchronizer ring 4 is firmly forced against the frustoconical surface 2c of the low speed gear 2 by the synchronizer keys 12 so that the rotation of the low speed gear 2 is synchronized with the rotation of the synchronizer ring 4 and therefore with the rotation of the sleeve due to the friction between the surfaces 2c and 4b. Further, the projections 17 on the sleeve 14 ride over the projections 13 on the keys 12, resiliently deflecting the springs 8 as shown in FIGS. 4(b) and (c) so that the projections 13 are now received in the recesses 18.

Figure 4D:
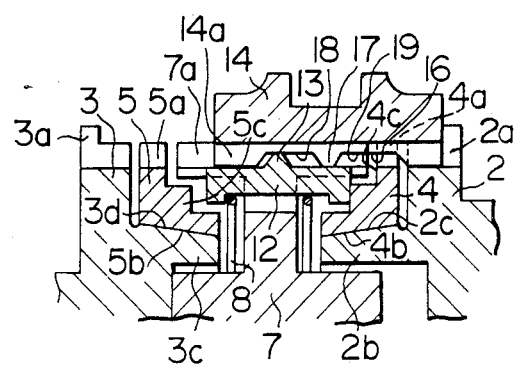
Figure 5E:
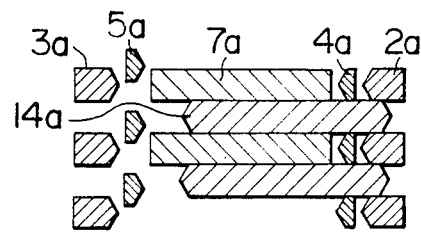

A further axial movement of the synchronizer sleeve 14 brings the spline teeth 14a into engagement with the spline teeth 2a on the low speed gear 2 as shown in FIG. 4(d) and FIG. 5(e). The teeth 2a are also chamfered at the ends adjacent to the synchronizer ring 4 to make the spline teeth 14a readily engageable with the spline teeth 2a. Similarly, the teeth 3a on the high speed gear 3 are chamfered at the ends adjacent to the synchronizer ring 5. The high speed gear 3 can be connected with the input shaft 1a in a similar manner by moving the synchronizer sleeve 14 in the opposite direction. At this instance, the synchronizer keys 12 are forced against the synchronizing ring 5 through the engagement between the projections 13 and 17 because the projections 13 are now received in the recesses 19.

FIG. 6 shows another embodiment of the present invention in which selected ones of the spline teeth 114a on the synchronizer sleeve 114 are formed at their intermediate portions with radially inward projections 117. Synchronizer keys 112 are each formed with a pair of recesses 118 and 119 to leave a radially outward projection 113. In other respects, the arrangements are the same as in the previous embodiment.

FIG. 7 shows how the teeth on the sleeve 14 engage with rings 4 and 5, and with hub 7.

According to the features of the present invention, the axial length N of the spline teeth 14a or 114a is larger than the distance or space L between the spline teeth 4a and 5a but smaller than the distance or space P between the spline teeth 2a and 3a. Thus, the auxiliary power transmission does not take a neutral position as in conventional arrangements. Therefore, it is possible to decrease the shifting stroke of the synchronizing sleeve. In a preferable arrangement, the axial length N of the spline tooth 14a is smaller than the distance M between the root of the chamfered portion of the spline tooth in one of the synchronizer rings and the adjacent end of the spline tooth in the gear at the side opposite to the said one synchronizer ring. More preferably, the axial length N of the spline tooth 114a should be smaller than the distance or space $M_1$ between the spline teeth on one of the synchronizer rings and the spline teeth on the gear at the side opposite to the said particular synchronizer ring.

The invention has thus been shown and described with reference to specific embodiments, however, it should be noted that the invention is in no way limited to the details of the illustrated structures but changes and modifications may be made without departing from the scope of the appended claims.

I claim:

1. An auxiliary power transmission comprising:

axially aligned input and intermediate shafts which are rotatable with respect to each other, said intermediate shaft being connected to a main power transmission;

a first gear rotatably mounted on said input shaft and having first external teeth;

a second gear mounted on said intermediate shaft to rotate therewith and having second external teeth;

a synchronizer hub disposed between said first and second gears and mounted on said input shaft to rotate therewith, said synchronizer hub being formed with external teeth;

a synchronizer sleeve having internal teeth which are in meshing engagement with said external teeth on said synchronizer hub and axially movable to bring the internal teeth thereon into meshing engagement alternatively with said first and second external teeth on said first and second gears;

first and second synchronizer rings respectively provided between said synchronizer hub and said first and second gears, said first and second synchronizer rings being formed with external teeth adapted to mesh with said internal teeth of the synchronizer sleeve;

first friction clutch means provided between said first gear and said first synchronizer ring for synchronizing said first gear in rotation with said synchronizer sleeve when the sleeve is moved axially toward the first gear, said first friction clutch means including an external frustoconical surface coaxially formed on said first gear and an internal frustoconical surface coaxially formed on said first synchronizer ring and adapted for frictional engagement with said external frustoconical surface when said first synchronizer ring is moved toward the first gear;

second friction clutch means provided between said second gear and said second synchronizer ring for synchronizing said second gear in rotation with said synchronizer sleeve when the sleeve is moved axially toward the second gear, said second friction clutch means including an external frustoconical surface coaxially formed on said second gear and an internal frustoconical surface coaxially formed on said second synchronizer ring and adapted for frictional engagement with said external frustoconical surface of said second gear when said second synchronizer ring is axially moved toward the second gear;

said synchronizer sleeve having an axial length so that the internal teeth therein engage both the external teeth on the first and second synchronizer rings when the sleeve is out of engagement with said first and second gears;

forcing means provided between the synchronizer sleeve and the synchronizer hub for alternately forcing one of the first and second synchronizer rings toward the gear cooperating with said one synchronizer ring when the synchronizer sleeve is axially moved toward the gear cooperating with said one synchronizer ring to thereby engage the friction clutch means between said one synchronizer ring and said cooperating gear;

said forcing means including at least one key disposed between the synchronizer sleeve and the synchronizer hub, engagement means being provided between the synchronizer sleeve and the key so that the key is forced against one of the synchronizer rings by the sleeve as soon as the sleeve is disengaged from the gear cooperating with the other synchronizer ring; said key being formed at an intermediate portion with radially outward projection means, the synchronizer sleeve being formed with radially inward projection means adapted for engagement with said radially outward projection means on the key.

2. An auxiliary power transmission in accordance with claim 1 in which at least one of said projection means on the key and said projection means on the synchronizer sleeve is formed with engagement surface means inclined with respect to the longitudinal axis of the transmission.

3. An auxiliary power transmission in accordance with claim 1 in which said key is provided with resilient means forcing it radially outwardly, said resilient means allowing the projection means on the sleeve to ride and pass over the projection means on the key when the sleeve is further forced axially after the friction clutch means is engaged.

4. An auxiliary power transmission in accordance with claim 1 in which said teeth on said synchronizer rings and on said gears have chamfered portions at ends adjacent to said synchronizer sleeve, each of the teeth on the synchronizer sleeve having a chamfered portion and an axial length smaller than a distance between a root portion of the chamfered portion of the tooth on one of the synchronizer rings and said end of the gear cooperating with the other synchronizer ring.

5. An auxiliary power transmission in accordance with claim 1 in which each of the teeth on the synchronizer sleeve has an axial length smaller than a distance between the teeth on one gear and the teeth on the synchronizer ring cooperating with the other gear.

6. An auxiliary power transmission in accordance with claim 1 in which said internal teeth of said synchronizer sleeve have coplanar ends.

7. An auxiliary power transmission in accordance with claim 3 in which said radially outward projection means on said key and said radially inward projection means on said synchronizer sleeve are located so that the radially inward projection means on said synchronizer sleeve is at a side of said radially outward projection means on said key and is adjacent to one of the first and second gears when said synchronizer sleeve is in engagement with said one gear, and said radially inward projection means on said synchronizer sleeve is substantially in contact with said radially outward projection means on said key, whereby the synchronizer sleeve can immediately start to force the key when the gear shifting operation is started for moving the synchronizer sleeve toward the other of the first and second gears.

8. An auxiliary power transmission in accordance with claim 6 in which said radially inward projection means on said synchronizer sleeve is formed at a longitudinally central portion of the sleeve and said radially outward projection means on said key is formed at a longitudinally central portion of the key.

* * * * *